United States Patent [19]

Ashcraft

[11] Patent Number: 5,628,532
[45] Date of Patent: May 13, 1997

[54] LAMINATED FUEL LINE AND CONNECTOR

[75] Inventor: Timothy A. Ashcraft, Dover, Ohio

[73] Assignee: Handy & Harman Automotive Group, Inc., Dover, Ohio

[21] Appl. No.: 554,650

[22] Filed: Nov. 8, 1995

Related U.S. Application Data

[62] Division of Ser. No. 430,038, Apr. 27, 1995.

[51] Int. Cl.$^6$ ........................................................ F16L 41/08
[52] U.S. Cl. ........................ 285/133.1; 285/190; 285/150; 285/281
[58] Field of Search ..................... 285/133.1, 150, 285/190, 179, 138, 132, 134, 281

[56] References Cited

U.S. PATENT DOCUMENTS

| | | |
|---|---|---|
| 664,950 | 1/1901 | Hewlings . |
| 2,410,912 | 11/1946 | Wenk ........................ 285/133.1 |
| 2,791,449 | 5/1957 | Monroe ........................ 285/134 |
| 2,838,074 | 6/1958 | Lauck ........................ 285/133.1 |
| 3,037,529 | 10/1962 | Hancik . |
| 3,269,422 | 8/1966 | Matthews et al. . |
| 3,847,208 | 11/1974 | Ollendorf . |
| 3,880,194 | 4/1975 | McNeal . |
| 3,901,281 | 8/1975 | Morrisey . |
| 3,986,732 | 10/1976 | Stanley ........................ 285/134 |
| 4,194,767 | 3/1980 | McCracken ........................ 285/190 X |
| 4,196,464 | 4/1980 | Russell . |
| 4,216,802 | 8/1980 | Bonnes et al. . |
| 4,343,844 | 8/1982 | Thayer et al. . |
| 4,462,620 | 7/1984 | Bambenek et al. . |
| 4,496,823 | 1/1985 | Mann . |
| 4,510,974 | 4/1985 | Natori et al. . |
| 4,559,973 | 12/1985 | Hane et al. . |
| 4,708,842 | 11/1987 | Veronesi et al. . |
| 4,733,800 | 3/1988 | Bjorkengren et al. . |
| 4,754,782 | 7/1988 | Grantham . |
| 4,758,455 | 7/1988 | Campbell et al. . |
| 4,786,086 | 11/1988 | Guthrie et al. . |
| 4,787,921 | 11/1988 | Shibata et al. . |
| 4,886,305 | 12/1989 | Martin ........................ 285/138 X |
| 4,906,496 | 3/1990 | Hosono et al. . |
| 4,930,544 | 6/1990 | Ziu . |
| 5,005,613 | 4/1991 | Stanley . |
| 5,038,833 | 8/1991 | Brunnhofer . |
| 5,040,830 | 8/1991 | Atkinson . |
| 5,056,492 | 10/1991 | Banse . |
| 5,076,329 | 12/1991 | Brunnhofer . |
| 5,120,084 | 6/1992 | Hashimoto . |
| 5,143,410 | 9/1992 | Takikawa . |
| 5,167,259 | 12/1992 | Brunnhofer . |
| 5,219,003 | 6/1993 | Kerschbaumer . |
| 5,284,184 | 2/1994 | Noone et al. . |
| 5,358,352 | 10/1994 | Ciez et al. ........................ 285/134 X |
| 5,398,977 | 3/1995 | Berger et al. ........................ 285/138 X |

*Primary Examiner*—Terry Lee Melius
*Assistant Examiner*—Heather Shackelford
*Attorney, Agent, or Firm*—Pennie & Edmonds LLP

[57] ABSTRACT

A laminated fuel line has an inner layer of a synthetic material such as Nylon, an intermediate vapor barrier layer that contains a polyethylene terephathalate material (such as MYLAR), and an outer layer preferably of a high temperature resistant thermoplastic material such as a polyamide or VICHEM olefinic/PVC. A channeled fuel tube has an inner fuel jacket concentrically formed within and spaced from a relatively larger outer jacket, each of which can be formed with the laminated structure above. A connector for the channeled fuel line has a tubular end connecting element for Connecting between the inner and outer fuel lines, a tubular inner connecting element for connecting to the inner line through the end connecting element, and a tubular outer connecting element connecting over both the end connecting element and the inner connecting element. The outer connecting element has a first passageway for communicating with the inner line and a second passageway for communicating with the outer line. The first and second passageways are formed perpendicular to each other.

6 Claims, 2 Drawing Sheets

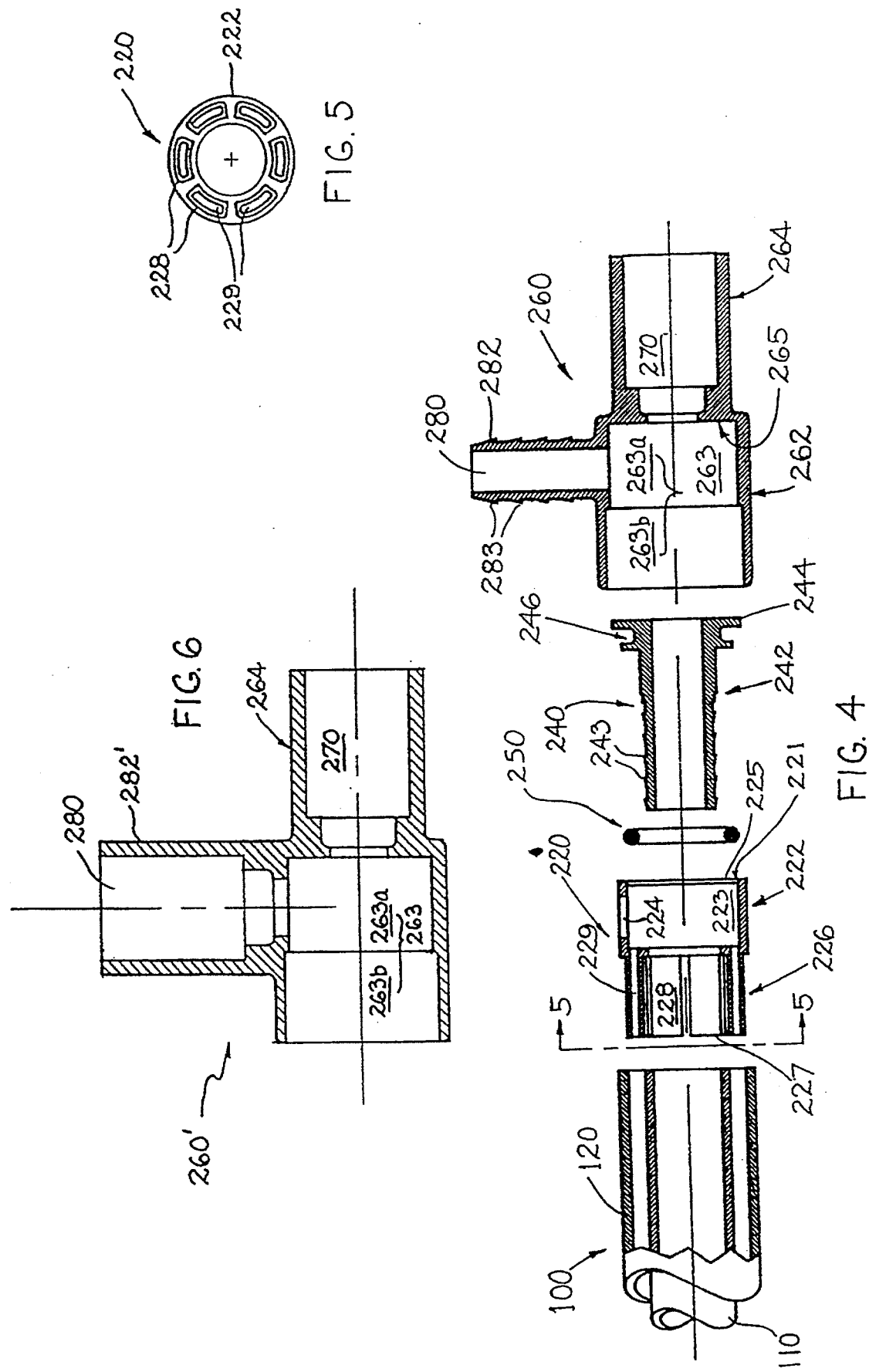

LAMINATED FUEL LINE AND CONNECTOR

This is a division of application Ser. No. 08/430,038, filed Apr. 27, 1995.

FIELD OF THE INVENTION

The present invention relates to a laminated fuel line and a connector therefor.

BACKGROUND

Laminated fuel lines usable with fuels containing alcohol (known as gasohol.) are described, for example, in U.S. Pat. Nos. 5,167,259; 5,076,329; 5,038,833 all issued to Brunnhofer. Such laminated fuel lines typically employ a petroleum resistant material such as polyamide, i.e., Nylon 6, Nylon 66, Nylon 11 or Nylon 12.

When a gasohol or alcohol containing fuel is used, in particular, the alcohol component, as well as other fuel components thereof, can diffuse into the polyamide layer causing it to swell. Basically, liquid fuel components can displace plasticizer contained within polyamide resins, creating communication paths for the fuel components to permeate to the exterior of the fuel tube. This problem can be avoided by using metal fuel lines, but metal lines are subject to corrosion and are more difficult to use. In U.S. Pat. No. 4,758,455 issued to Campbell et al., a composite fuel and vapor tube uses an inner liner of a petroleum resistant material such as nylon and a metal strip surrounding and adhered to the outer surface of the liner, and a flexible outer jacket of a halogenated plastic or elastomer. This tube is bendable to an unsupported self sustaining shape and has good heat dissipation properties. Notwithstanding the advantages obtained therefrom, the cost of manufacturing such a construction is relatively expensive.

Aforementioned Brunnhofer contemplates using a barrier layer formed of a copolymer of ethylene and vinyl alcohol with a relatively thicker polyamide layer formed over the inner polyamide layer in attempting to prevent or reduce the alcohol component from permeating through its outer polyamide layer, which can swell the line. Brunnhofer describes that a barrier layer of polyvinyl-alcohol alone is not effective against alcohol. It requires a relatively thick polyamide outer layer in contact with the barrier layer. Specifically, although the inner polyamide layer can undergo swelling, the relatively thicker outer layer that is not directly exposed to the fuel resists the swelling force. Although the polyvinyl barrier may offer some degree of protection against alcohol permeation when properly laminated or bonded to the outer layer, its effectiveness diminishes when the barrier layer becomes delaminated therefrom. U.S. Pat. No. 5,219,003 issued to Kerschbaumer discloses that the adhesion between polyamide and polyvinyl is very slight such that they can delaminate easily. Corrosive chemicals, such salts, which can develop from copper or metal ions present in the fuel, can penetrate between the layers through the fuel ends and delaminate the barrier layer, reducing the vapor barrier effectiveness.

In addition, due to the extreme brittle nature of the polyethylene vinyl alcohol barrier layer, it cannot withstand cold impact tests. In this regard, Kerschbaumer contemplates use of three different polyamide layers, with the barrier layer formed of nylon 66 in attempting form a laminated fuel tube capable of withstanding cold impact tests.

The present invention provides a low cost fuel tube that alleviates the deficiencies of the prior art.

SUMMARY OF THE INVENTION

The present invention is directed to a laminated fuel line, a laminated channeled fuel line, and a connector for the channeled fuel line. The laminated fuel line comprises a tubular inner layer of a petroleum resistant thermoplastic material having a central bore forming an inner fluid passageway, a vapor barrier layer concentrically formed around in contact with the inner layer, and an outer layer of a thermoplastic material concentrically formed around the barrier layer. The barrier layer is preferably composed of aluminum coated polyethylene terephathalate film (MYLAR), but can be composed of any one or a combination of MYLAR, aluminum coated MYLAR, MYLAR polyvinyl fluoride (PVF) and MYLAR polyvinyl difluoride (PVDF) films. The inner and outer layers can be composed of a polyamide such as Nylon 12. However, if the fuel line is exposed to a high temperature environment, it is preferable for the outer layer to be composed of heat resistant thermoplastic, preferably an olefinic/PVC alloy material sold under the trade name VICHEM.

Another aspect of the present invention is a channeled fuel line comprising a tubular inner tubular layer or jacket, an outer jacket of a substantially larger size formed over the inner jacket, and means for maintaining the inner jacket spaced from the outer jacket. The inner jacket can be formed of a single layer of a petroleum resistant thermoplastic material having a central bore forming an inner passageway for fluid communication or can be formed of the aforementioned laminated fuel line.

The space formed between an inner side of the outer jacket and outer side of the inner jacket defines a separate outer fluid communication passageway. The outer jacket includes aforementioned vapor barrier layer of a MYLAR film to block fuel components from permeating therethrough. Specifically, the outer jacket comprises a first or intermediary layer and a second or outer layer of a petroleum resistant material, with the barrier layer sandwiched therebetween.

The spacing means can be a plurality of radially extending spacers formed between the outer jacket and the inner jacket to maintain the inner jacket concentric with the outer layer. The outer passageway is defined between the outer side of the inner jacket, the inner side of the outer jacket and the sidewalls of the spacers.

Preferably, the inner jacket and the first and second layers of the outer jacket are formed of a polyamide such as Nylon 6, Nylon 66, Nylon 11 or Nylon 12. Again, if the fuel line is to be used in areas of high heat, then it is preferable for the outer or second layer of the outer jacket to be formed of aforementioned VICHEM olefinic/PVC material.

In the channeled fuel line, although the radially extending spacers can be separately formed, it is preferable for them to be integrally formed with the inner side of the outer jacket or with the outer side of the inner jacket.

Another aspect of the invention is a connector for the above described channeled type of fuel line having inner and outer fluid passageways. The connector comprises a tubular end connecting element, a tubular inner connecting element and a tubular outer connecting element. The outer connecting element connects to the outer passageway to communicate therewith whereas the inner connecting element connects to the inner passageway through the end connecting element. The inner connecting element is positioned substantially coaxially with the end connecting element. The outer connecting element connects both the end connecting element and the inner connecting element. The outer connecting element has a first passageway for communicating with the inner passageway and a second passageway for communicating with the outer passageway. The first and second passageways are substantially perpendicular to each other.

Specifically, the end connecting element comprises a tubular proximal portion having at least one side wall opening that can communicate with the second passageway and a distal portion formed by a plurality of circularly spaced tubes extending substantially collinearly with the proximal portion. The distal portion is dimensioned to frictionally engage between the inner and the outer jackets.

The inner connecting element comprises a tubular distal portion dimensioned to sealingly engage an inner wall of the inner jacket and a flange at a proximal end thereof for abutting and sealing the proximal end of the end connecting element.

The outer connecting element comprises a distal portion and a tubular proximal portion. The distal portion has an inner chamber dimensioned to permit insertion of the proximal portion of the end connecting element along with the flange. The distal portion of the outer connecting element sealingly engages over the outer jacket, with the distal portion concentric with the inner connecting element and the end connecting element. The first passageway is formed within the proximal portion of the outer connecting element and is substantially collinear with the inner connecting element, whereas the second passageway extends substantially perpendicular from the distal portion of the outer connecting element.

BRIEF DESCRIPTION OF THE DRAWINGS

These and other features, aspects, and advantages of the present invention will become much more apparent from the following description, appended claims, and accompanying drawings.

FIG. 4 shows an exploded cross-sectional view of the connecting elements of the connector.

FIG. 5 shows a front view of the end connecting element taken along line 5—5 of FIG. 6.

FIG. 6 shows a cross sectional view of an alternative embodiment of the outer connecting element.

DETAILED DESCRIPTION OF THE DRAWINGS

Figure 1:
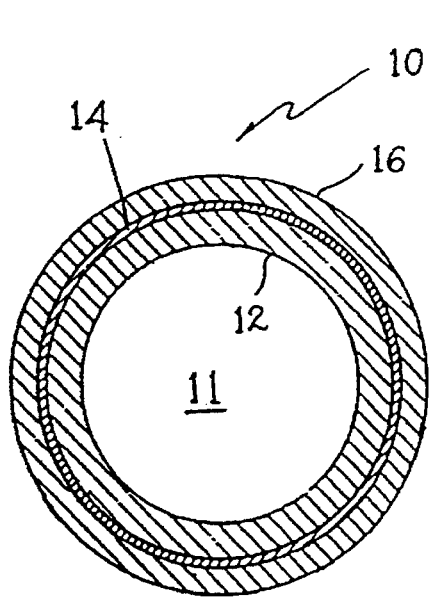
FIG. 1 shows a cross-section of a fuel line according to the present invention.

FIG. 1 shows a cross section of a single laminated fuel tube 10 according to the present invention. The laminated fuel line comprises a tubular inner layer 12 of a petroleum resistant material having a central bore forming an inner passageway 11 for fluid, a vapor barrier layer 14 concentrically formed over and in contact with the inner layer, and an outer layer 16 of a thermoplastic material concentrically formed over and in contact with the barrier layer. The barrier layer is preferably composed of commercially available aluminum coated polyethylene terephathalate film (MYLAR), but can be composed of any one or a combination of commercially available MYLAR, aluminum coated MYLAR, MYLAR polyvinyl fluoride (PVF) and MYLAR polyvinyl difluoride (PVDF) films. The aluminum coating is a relatively thin coating formed on both sides or on either side thereof. The aluminum is preferably thin so as to not effect the MYLAR layer—s bending or flexing properties. Although, the aluminum coating is thin, it enhances the permeation barrier effectiveness.

Unlike prior art barrier layers, the present MYLAR composition barrier layer need not adhere to the walls of the inner and outer layers to be effective. Rather, according to the present invention, the MYLAR composition barrier layer is merely sandwiched in place by preferably shrink fitting the outer layer tightly over the MYLAR barrier layer by a conventional means or extrusion method.

The inner and outer layers can be composed of polyamide, including Nylon 6, Nylon 11, Nylon 12 and Nylon 66, with Nylon 12 being preferred, and variation of these Nylons in conductive grades. Conductive Nylons are preferable in that they resist any potential electrostatic discharge (ESD) that can occur in some applications. If the fuel line is exposed to a high temperature environment, it is preferable to form the outer layer with a high temperature resistant thermoplastic. One commercially available material is an olefinic/PVC material sold under the tradename VICHEM.

Figure 2:
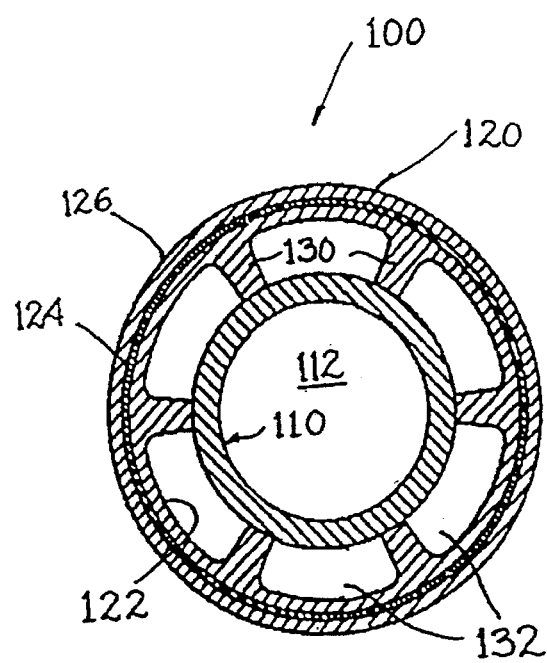
FIG. 2 shows a cross-section of a channeled line according to the present invention.

FIG. 2 shows a channeled fuel line 100 according to the present invention. The channeled fuel line comprises an inner fuel layer or jacket 110, a substantially larger outer jacket 120 and spacing means for maintaining the outer jacket 120 concentric with the inner jacket 110. The inner jacket has a central bore forming an inner passageway 112 for fluid communication. Although the inner jacket is shown as a single layer, it can also have a laminated structure similar to the fuel line described above with respect to FIG. 1. The outer jacket comprises a barrier layer 124 sandwiched between an intermediary or first layer 122 and an outer or second layer 126. Again, the barrier layer 124 is preferably composed of any one or combination of the aforementioned aluminum coated MYLAR, MYLAR, MYLAR PVF and MYLAR PVDF films, sandwiched in the manner described above with respect to FIG. 1.

The spacing means is defined by a plurality of radially extending spacers 130 formed between the inner and outer jackets. The spacers 130 can extend substantially the entire length of the channeled fuel line to maintain the outer jacket 120 concentric with the inner jacket 110. Preferably, the spacers 130 are spaced apart at the same intervals around the inner jacket. Although the spacers can be formed throughout the length of the fuel line, they can also be placed at intervals along the length of the fuel line if desired, as long as the spacers maintain the outer jacket concentrically spaced within the inner jacket. Moreover, although the radially extending spacers 130 can be separately formed, it is preferable for them to be integrally formed with the first layer 122 as shown in FIG. 2 or integrally formed with the inner jacket 110 for ease of assembly, where the outer jacket can be slid over, extruded, or formed over the inner jacket. The space formed between the outer jacket and the inner jacket forms an outer fluid passageway 132.

The inner jacket 110 and the first layer 122 of the outer jacket 120 directly exposed to the fuel can be composed of any suitable petroleum resistant material such as a polyamide, i.e., Nylon 6, Nylon 11, Nylon 12 and Nylon 66. The outer layer 126 of the outer jacket 120 can also be any suitable thermoplastic layer, such as Nylon 12. However, if the fuel line is exposed to a high temperature environment, such as an engine compartment, it is preferable to form the outer layer with the aforementioned heat resistant VICHEM olefinic/PVC material.

The inner passageway 112 can be used, for example, as a fuel feed line and the outer passageway 132 as a fuel return or vapor return line, or vice-versa. In this regard, since the inner jacket 110 is shielded by the outer jacket 120, including the barrier layer 124, any fuel component permeating through the inner layer is prevented from reaching the environment. Any fuel component permeated through the inner jacket is returned or captured through the outer passageway 132. Accordingly, the inner jacket does not need a separate barrier layer. However, the inner jacket 110 can be formed of the a laminated structure similar to the afore-described fuel line 10 shown in FIG. 1 if desired, such as when two different fuels are conveyed through inner and outer passageways.

The present channeled fuel tube can serve as a dual fuel path. However, if the outer passageway is used for conveying fuel, fuel component permeating into the environment will be greater due to the fuel being directly in contact against the inner wall of the outer jacket 120. Accordingly, the lowest permeation can be achieved by conveying fuel through the inner passageway 112 and recovering any permeated vapor through the outer passageway 132.

FIGS. 3–6 show a connector 200 for a channeled type of fuel line 100 having an inner fuel passageway 112 and an outer fuel passageway 132. The connector comprises a tubular end connecting element 220, a tubular inner connecting element 240 and a tubular outer connecting element 260, 260'. The end connecting element 220 connects to the channeled fuel line 100, between the outer side of the inner jacket 110 and the inner wall of the outer jacket 120. The inner connecting element 240 connects to the inner side of the inner jacket 110 through the end connecting element 220 and is positioned substantially coaxially with the end connecting element 220. The outer connecting element 260, 260' connects both the end connecting element 220 and the inner connecting element 240 and is positioned coaxially over both the elements 220 and 240. The outer connecting element 260, 260' has a first connector passageway 270 for communicating with the inner passageway 112 and a second connector passageway 280 for communicating with the outer passageway 132. The first and second passageways 270 and 280 are substantially perpendicular to each other.

Specifically, the end connecting element 220 comprises a tubular proximal portion 222 having at least one side wall opening 224 for communicating with the second passageway 280 and a distal portion 226 formed by a plurality of circularly spaced tubular arms 228 extending substantially collinearly with the proximal portion. Each of the arms 228 has a passageway 229 communicating with the second passageway 280 via the passageway 223 defined by the inner wall of the proximal portion. The arms 228 are dimensioned to frictionally engage between the inner side of the outer jacket 120 and the outer side of the inner jacket 110. The proximal end 225 of the end connecting element preferably includes an annular chamfer 221.

The inner connecting element 240 comprises a tubular member having a distal portion 242 dimensioned to sealingly engage the inner side of the inner jacket 110, and a flange 244 formed at a proximal end thereof. The distal portion 242 can have tapered outer friction enhancing ridges 243 to ensure a tight, sealing connection with the inner jacket. The flange has an annular groove 246 for seating a seal, such as an O-ring 250. The distal portion 242 is inserted through the passageway 223 from the proximal end 225 toward the distal end 227 of the end connecting element 220 until the flange 244 and the O-ring 250 sealingly abut the proximal end 225 of the end connecting element. In this respect, the chamfer 221 is provided to accommodate insertion of the proximal end 225 between the outer periphery of the O-ring and the wall of the chamber 263. The O-ring can be made of any conventional material useable with nylon or fuel line quick connect fittings for conventional gasoline fuel systems, such as fluorosilicone (FVMQ), FVMQ/ fluorocarbon (FKM) blend, and perfluorovinyl terpolymer fluorocarbon (FKM-GFLT). Although the preferred embodiment is shown with an O-ring 250, the connector according to the present invention can also be made without using such an O-ring.

Figure 3:
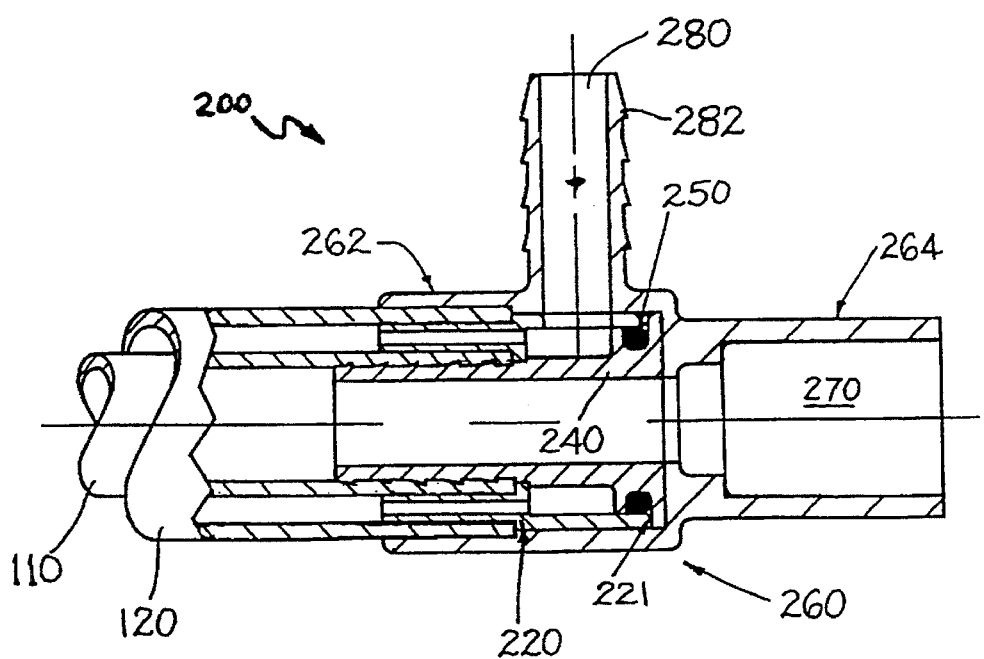
FIG. 3 shows a cross-sectional view of the channeled line connector shown with its connecting element assembled.

The outer connecting element 260, 260' comprises a distal portion 262 and a proximal portion 264. The distal portion 262 has a chamber 263 defined by the wall thereof which is dimensioned to permit insertion of the proximal portion 222 of the end connecting element along with the flange. The distal portion 262 sealingly engages the outer side of the outer jacket 120 and is concentric with the inner and end connecting elements. The flange 244 is positioned to abut against a radial wall 265, as shown in FIG. 3. The chamber 263 has a first segment 263a dimensioned to sealingly engage the proximal portion 222 of the end connecting element 220 and a second segment 263b having a larger dimension to permit insertion of the end portion of the outer jacket 120 as shown in FIG. 3. The second passageway 280 that is perpendicular to the passageway 263 is defined by a tubular connector 282, 282' extending substantially radially from the distal portion 262, which communicates with the chamber 263. Again, the tubular connector 282 can have tapered outer ridges 283 on the outer surface thereof to enhance friction. In the alternative embodiment, as shown in FIG. 6, the tubular connector 282' can be structurally similar to the proximal portion 264.

The first passageway 270 is defined by an inner wall of the distal portion 264 and is substantially collinear with the chamber 263, the inner connecting element 240 and the end connecting element 220. The radial wall 265 has an opening for permitting fluid communication between the chamber 263 with the first passageway 270.

In assembly, the arms 228 of the end connecting element 220 is pushed into the outer passageway 132 until the end of the fuel line abuts against the larger proximal portion 222. The distal portion 242 of the inner connection element 220 is inserted through the passageway 223 and pushed into the inner passageway 112 until the flange 244 abuts against the proximal end 225 of the end connecting element. The end of the fuel line connected to the end connection element 220 and the inner connection element 240 is inserted into the distal portion 262 of the outer connecting element 260, until the proximal portion 222 of the end connecting element occupies the chamber portion 263a and the flange 244 of the inner connection element abuts against the wall 265, with the opening 224 aligned with the second passageway 280. The end of the fuel line is further pushed into the distal portion 262 until the outer jacket 120 abuts against the first segment 263a. The flange 244 sealingly abuts against the wall 265 so that the inner passageway 112 communicates with the first passageway 270 via the inner connecting element 240. The outer passageway communicates with the second passageway 280 through the passageways 229, the passageway 223 and the opening 224. Accordingly, the fluid communication between the inner and outer passageways 112 and 132 are kept separate.

Given the disclosure of the present invention, one versed in the art would readily appreciate the fact that there can be other embodiments and modifications that are well within the scope and spirit of the disclosure set forth herein, but not specifically depicted and described. Accordingly, all expedient modifications readily attainable by one versed in the art from the disclosure set forth herein that are within the scope and spirit of the present invention are to be included as further embodiments of the present invention. The scope of the present invention accordingly is to be defined as set forth in the appended claims.

What is claimed is:

1. A connector comprising:

a tubular inner connecting element for connecting to a first line;

a tubular end connecting element being coaxial and radially outwardly spaced with said inner connecting element, to define an axial passageway therebetween for communicating with a second line; and an integral tubular outer connecting element connecting over both said end connecting element and said inner connecting element, said outer connecting element having a first passageway for communicating with said second line and a second passageway for communicating with said first line.

2. A connector according to claim 1, wherein said first and second passageways are substantially perpendicular to each other.

3. A connector comprising:

a tubular inner connecting element for connecting to a first line;

a tubular end connecting element being coaxial and radially outwardly spaced with said inner connecting element; and a tubular outer connecting element connecting over both said end connecting element and said inner connecting element, said outer connecting element having a first passageway for communicatinq with said second line and a second passageway for communicating with said first line, wherein said end connecting element comprises a tubular proximal portion having at least one side wall opening in communication to said second passageway and a distal portion formed by a plurality of circularly spaced tubes extending substantially collinearly with said proximal portion, said spaced tubes communicating with said first line and said side wall opening to permit fluid communication between said first line and said second passageway.

4. A connector according to claim 3, wherein said inner connecting element comprises a distal portion in connection to said second passageway and a flange at a proximal end of said inner connecting element for abutting and sealing a proximal end of said end connecting element, said inner connecting element being concentric with said end connecting element.

5. A connector according to claim 4, wherein said outer connecting element comprises a distal portion and a proximal portion, said distal portion thereof having an inner wall dimensioned to permit insertion of said proximal portion of said end connecting element along with said flange, while permitting said distal portion of said outer connecting element to sealing engage over said first line and concentric with said inner connecting element and said end connecting element.

6. A connector according to claim 5, wherein said first passageway is formed within said proximal portion of said outer connecting element and is substantially collinear with said distal portion of said outer connecting element, wherein said second passageway extends substantially perpendicular from said distal portion of said outer connecting element.

* * * * *